(12) United States Patent
Hutson et al.

(10) Patent No.: US 8,083,143 B1
(45) Date of Patent: Dec. 27, 2011

(54) SEMI-AUTOMATIC INERTIAL WHEEL DEVICE IN A HAND-OPERATED DOCUMENT READER/IMAGER

(75) Inventors: Sammy C. Hutson, Novi, MI (US); Michael J. Moore, Beverly Hills, MI (US); John C Gudenburr, Canton, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1166 days.

(21) Appl. No.: 11/893,642

(22) Filed: Aug. 17, 2007

(51) Int. Cl.
G06K 7/08 (2006.01)
(52) U.S. Cl. ........................................................ 235/449
(58) Field of Classification Search ................... 235/449
See application file for complete search history.

(56) References Cited

U.S. PATENT DOCUMENTS

| | | | | |
|---|---|---|---|---|
| 4,047,229 | A * | 9/1977 | Kobylarz et al. | 360/2 |
| 6,530,704 | B2 * | 3/2003 | Omura | 400/58 |
| 6,659,347 | B1 * | 12/2003 | Moore et al. | 235/449 |
| 7,204,416 | B1 * | 4/2007 | Desai et al. | 235/454 |

* cited by examiner

Primary Examiner — Daniel Hess
Assistant Examiner — David Tardif
(74) Attorney, Agent, or Firm — Honigman Miller Schwartz and Cohn LLP

(57) ABSTRACT

A hand-operated document processor includes a base for receiving a document containing magnetic ink character data to be read and recognized. A manually operated moving magnetic ink character recognition (MICR) subsystem includes a MICR read head and is attached to the base such that movement of the subsystem causes the MICR read head to pass over the magnetic ink character data on the document. MICR reading and recognition logic receives the signal from the MICR read head. An inertial wheel arrangement includes a clutch and an inertia wheel. The inertia wheel connects through the clutch to drive the moving MICR subsystem.

18 Claims, 5 Drawing Sheets

SEMI-AUTOMATIC INERTIAL WHEEL DEVICE IN A HAND-OPERATED DOCUMENT READER/IMAGER

BACKGROUND OF THE INVENTION

1. Field of the Invention

The invention relates to document processing, document imaging, and magnetic ink character recognition. The invention further relates to hand-operated document readers/imagers, and to methods and systems for providing controlled and repeatable motion in a non-motorized system.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In addition to large document processing systems that handle stacks of documents, smaller systems also exist. These smaller document processing systems may handle smaller stacks of documents, or may even handle single documents, fed one at a time. There are also hand-operated document readers/imagers.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006 (formerly published as X9.27) "Print and Test Specifications for Magnetic Ink Printing (MICR)" as published by Accredited Standards Committee X9, Inc., Annapolis, Md., United States. Based on the design of the standard E-13B character set, in order that a MICR reader reliably read with a high correct character read rate and with a very low substitution rate, the document velocity must be precisely known during reading or otherwise be speed-controlled so that it does not vary.

These conventional approaches are acceptable when the velocity of the document is either known or can be controlled. In fact, conventional approaches to MICR typically involve rather complex schemes for controlling the velocity of the document or attempting to measure its velocity at different times as the document moves past the MICR read head. There has also been an approach to MICR reading and recognition that utilizes a dual gap read head to eliminate the need for precise knowledge or control of the document velocity.

In a hand-operated document reader/imager, the document is placed on a base and the MICR/image device is moved over the document from right to left, which is the traditional direction of larger document readers. During this movement, the MICR characters are recognized and the front image of the document is captured.

In more detail, the operational sequence of a manually operated linear check or document scanning device is as follows. A check or document is positioned on the bed of the device. The module that holds the contact image sensor and the magnetic read head is moved across the check or document, with the module being guided by a linear rod. The magnetic read head reads the MICR code line at the bottom of the document, and the contact image sensor scans the document. Data from both devices is passed to the electronics of the system for processing.

In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error.

The contact image sensor has a maximum speed limit, beyond which it will fail to operate properly. And, the MICR reader has a minimum speed limit, below which it cannot reliably operate. Accordingly, the speed of the scan must remain between these limits.

A motorized system can provide the required speed control, but is expensive. With a simple inexpensive manual operation, the scanning speed can and will vary from item to item, and over the length of the scan of a single item.

For the foregoing reasons, there is a need for an improved method and system for providing controlled and repeatable motion in a non-motorized hand-operated reader/imager.

SUMMARY OF INVENTION

It is an object of the invention to provide an improved method and system for providing controlled and repeatable motion in a non-motorized hand-operated reader/imager.

According to the invention, a hand-operated document processor comprises a base for receiving a document containing magnetic ink character data to be read and recognized, and a moving magnetic ink character recognition (MICR) subsystem. The subsystem includes a MICR read head and is attached to the base such that movement of the subsystem causes the MICR read head to pass over the magnetic ink character data on the document. MICR reading and recognition logic receives the signal from the MICR read head.

An inertia wheel is connected through a clutch to drive the moving MICR subsystem at the required speed. The inertia wheel may be arranged to be manually spun up such as by using a conventional recoil starter as in a lawn mower pull starter acting through a one-way clutch. The clutch that connects the inertia wheel to the MICR subsystem preferably connects the inertia wheel through the clutch to a belt or gear drive to drive the MICR subsystem.

In a preferred embodiment, a tachometer measures the inertia wheel speed, and an output signal from the tachometer is used to illuminate a series of light emitting diodes (LEDs) to provide feedback to the operator to achieve the optimum wheel speed range. The tachometer output signal also provides precision speed feedback to the MICR reading and recognition logic during the scan operation.

In operation of the preferred embodiment, once the document is positioned on the base of the hand-operated document reader/imager, the inertia wheel is spun up. The operator presses a release to engage the clutch to drive the movable MICR subsystem. The energy stored in the inertia wheel drives the moving MICR subsystem over the face of the document at a controlled speed.

In some implementations, the moving MICR subsystem further comprises an image sensor that passes over the document as the MICR read head passes over the magnetic ink character data on the document.

DETAILED DESCRIPTION OF THE PREFERRED EMBODIMENTS

The E-13B character set contains ten characters and four symbols as defined in the ANS X9.100-20-2006 (formerly published as X9.27) "Print and Test Specifications for Magnetic Ink Printing (MICR)" as published by Accredited Standards Committee X9, Inc., Annapolis, Md., United States. When used on a document for automated machine reading, the characters and symbols in the set must be printed using magnetic ink. ANS X9.100-20-2006 defines the dimensions of each character/symbol and the expected nominal waveform peak position and relative amplitude of waveform peaks.

Figure 1:
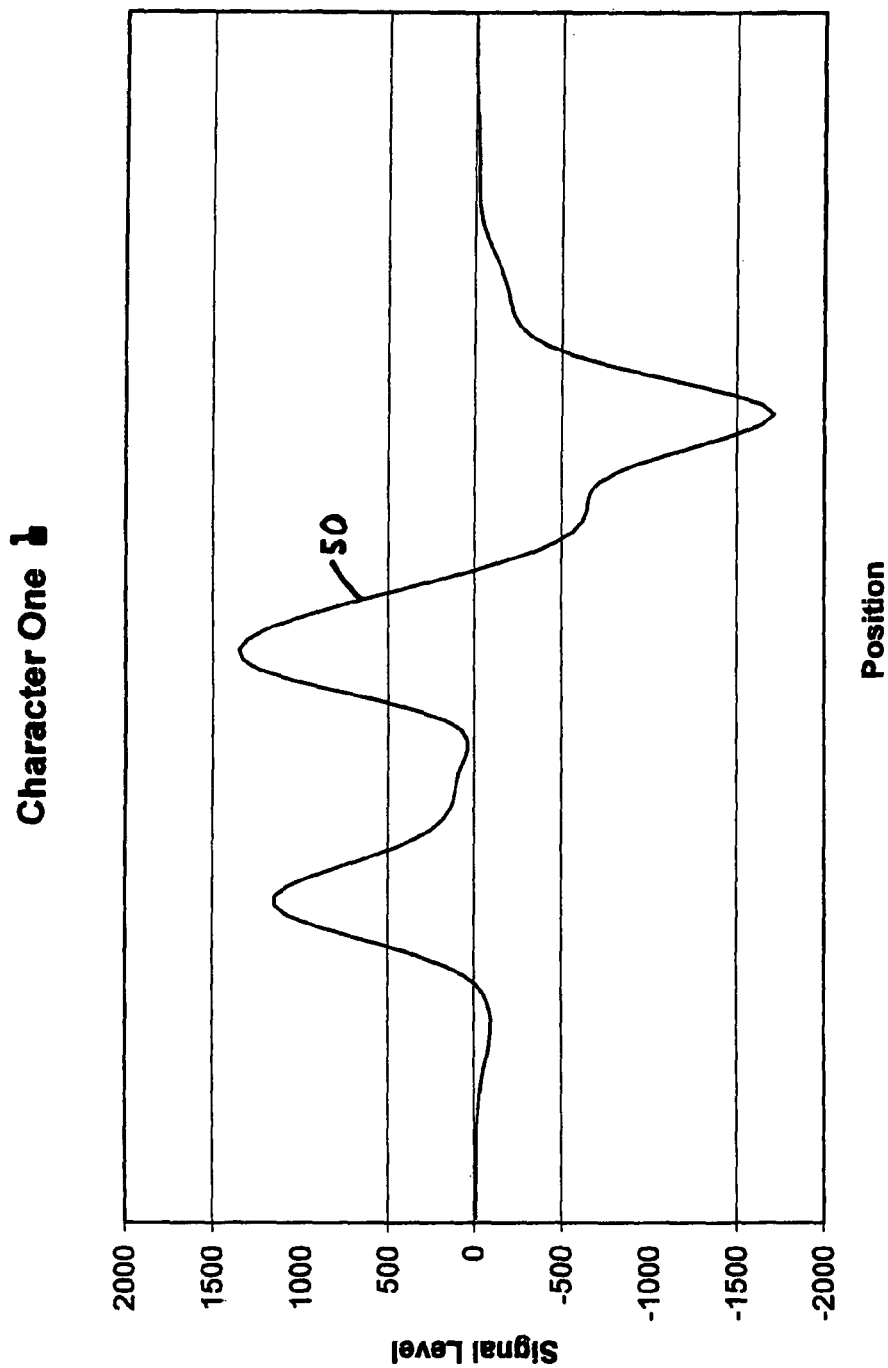
FIG. 1 shows the waveform for the magnetic ink character one, from the E-13B MICR character set as used on many financial payment documents, as read from a responsive magnetic signal gap read head when the magnetized character is passed by the magnetic read head.

FIG. 1 shows the waveform for the magnetic ink character one, from the E-13B MICR character set, as read from a responsive magnetic signal gap read head when the magnetized character is passed by the magnetic read head. The waveform is indicated at 50. As illustrated, the x-axis represents the position of the read head, and the y-axis represents the signal level.

MICR reading and recognition generally involves determining peak position information for a waveform generated by a single gap magnetic read head that passes over the magnetic ink characters on a document. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006.

Figure 2:
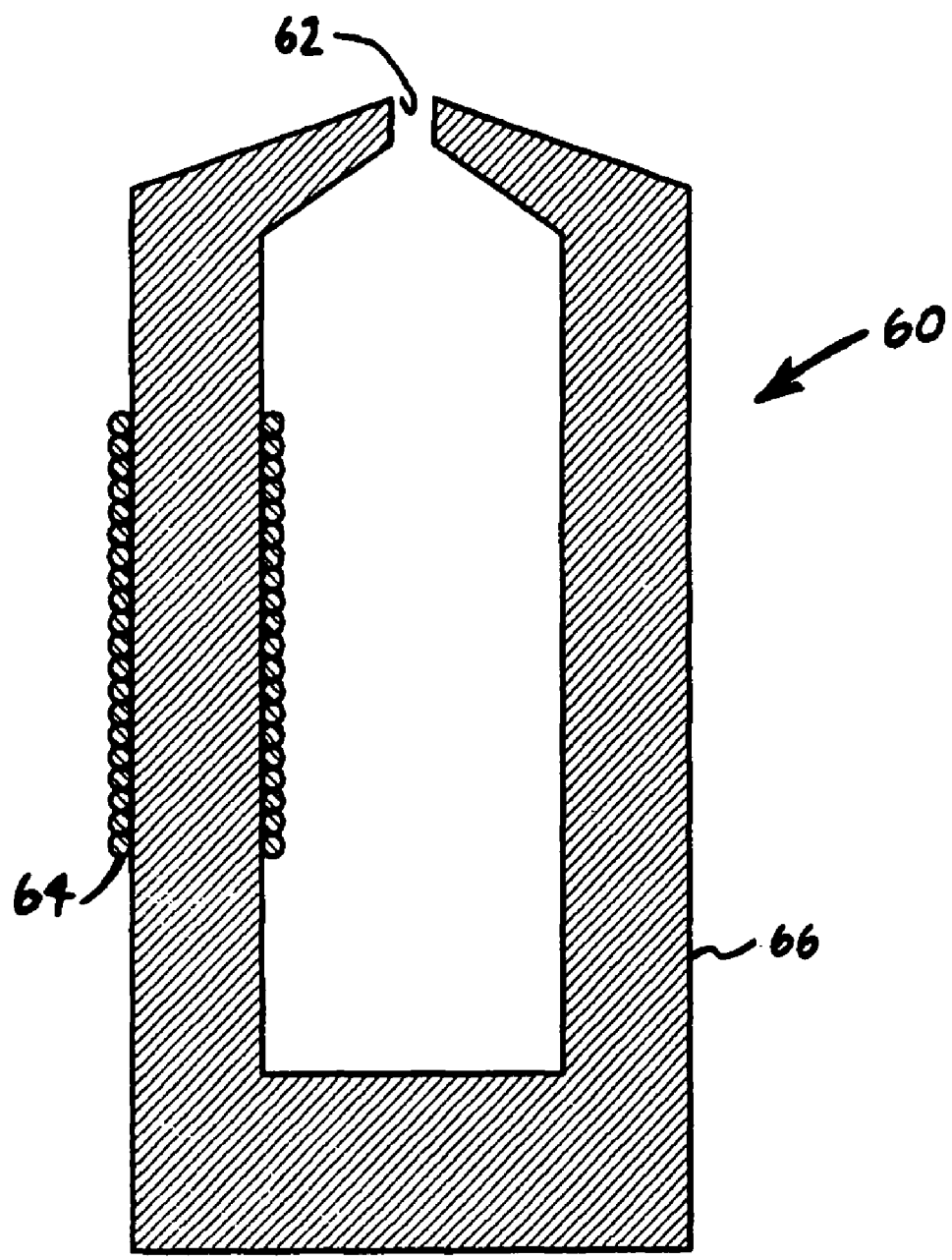
FIG. 2 is a cross-section view of a read head, which is one example of a suitable read head for reading magnetic ink characters.

In FIG. 2, a read head is generally indicated at 60, and includes a gap 62. The read head utilizes sensing coil 64. Core 66 forms a path for the magnetic flux changes experienced when the reader passes over magnetic ink. Of course, it is appreciated that alternative readers may be used, and any suitable technique may be utilized for assuring that flux variation from the magnetic ink characters is sensed.

Figure 3:
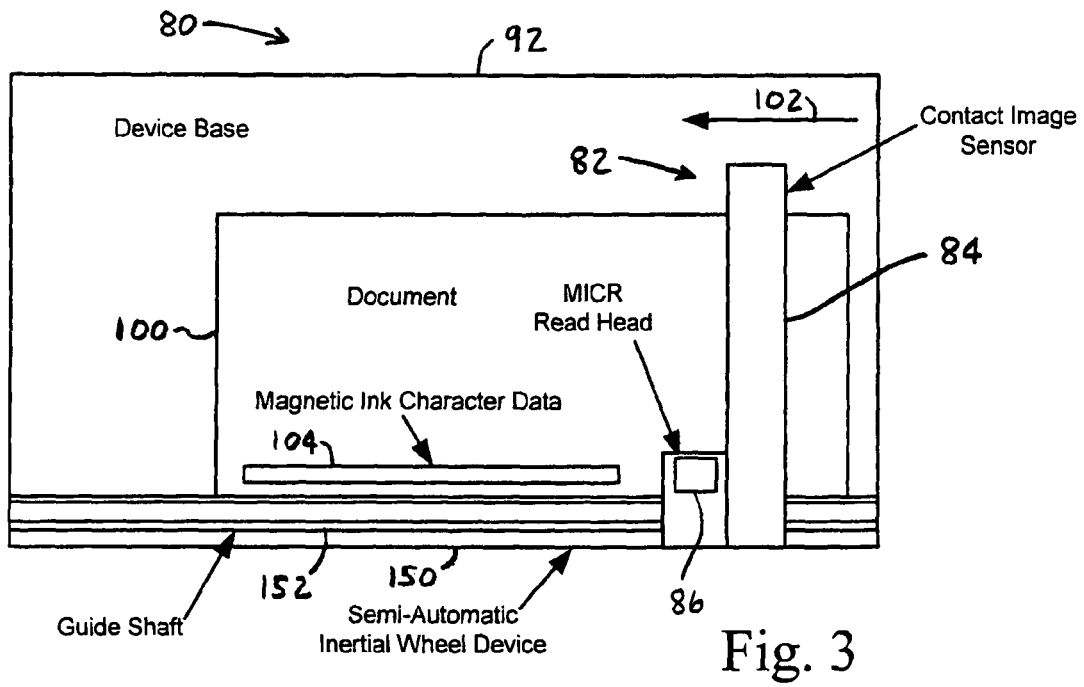
FIG. 3 illustrates a top view of a hand-operated document reader/imager made in accordance with the invention.
Figure 4:
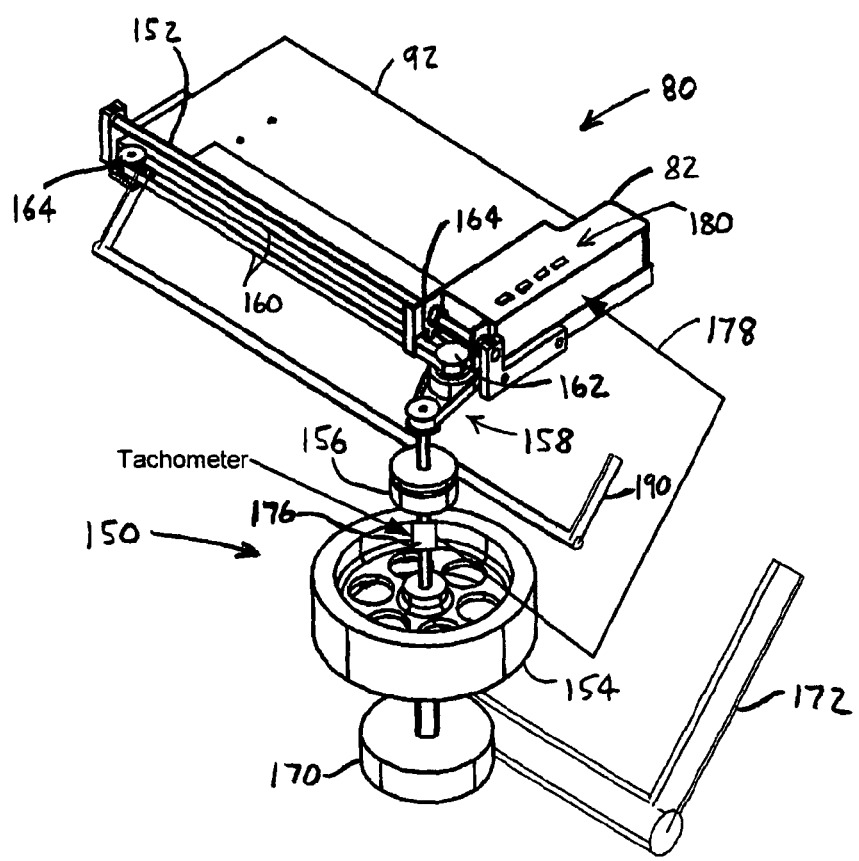
FIG. 4 illustrates a schematic diagram depicting the inertia wheel arrangement in an exemplary implementation.

An exemplary embodiment of the invention is illustrated in FIGS. 3-6. FIGS. 3 and 4 illustrate a hand-operated document reader/imager 80. As best shown in FIG. 3, document reader/imager 80 includes a moving MICR/image subsystem 82. Subsystem 82 includes a contact image sensor 84, and a MICR read head 86. Contact image sensor 84 captures an image of the document 100 when subsystem 82 is moved across the document 100. Contact image sensor 84 captures the front image of the document 100 when the document 100 is placed face-up on the base 92 of the reader/imager 80 and the MICR/image subsystem 82 is moved from right to left over document 100 as indicated by arrow 102.

MICR read head 86 is for reading the magnetic ink character data 104 on document 100. During the front image capture, the MICR code line is read according to a traditional MICR algorithm as MICR read head 86 passes from right to left over the magnetic ink character data 104 on document 100.

With continuing reference to FIGS. 3 and 4, a semi-automatic inertial wheel device 150 includes inertia wheel 154. The inertia wheel 154 is connected through a clutch mechanism 156. Clutch mechanism 156 connects inertia wheel 154 to a belt and pulley speed reduction mechanism 158 to drive moving MICR/image subsystem 82 at the required speed for scanning. Moving MICR/image subsystem 82 rides along a linear guide shaft 152 and holds the contact image sensor 84 and the magnetic read head 86. The magnetic read head 86 reads the MICR code line 104 at the bottom of the document 100, and the contact image sensor 84 scans the document 100. In further detail, the belt and pulley gear reduction mechanism 158 drives pulley 162. Pulley 162 is connected to pulley 164 by belt 160. MICR/image subsystem 82 is secured, at attachment member 164, to belt 160 such that the inertia wheel 154 is able to drive the MICR/image subsystem 82.

The inertia wheel 154, in this illustrated embodiment, is arranged to be manually spun up using a suitable spin-up device and recoil spring mechanism 170, and manual spin-up mechanism 172. For example, a conventional recoil starter 170 as in a lawn mower pull starter acting through a one-way clutch 172 may be used.

In the preferred embodiment, a tachometer 176 measures the speed of the inertia wheel 154. An output signal from the tachometer 176 is provided to the MICR reading and recognition logic during the scan operation as indicated by arrow 178, showing the output signal being generally provided to the system electronics to provide precision speed feedback. In one contemplated arrangement, the output signal from tachometer 176 is used to illuminate a series of light emitting diodes (LEDs) 180 to provide feedback to the operator. In this way, the LEDs can be illuminated to inform the operator when the inertia wheel 154 is in the optimum wheel speed range.

With continuing reference to FIGS. 3 and 4, in operation of the preferred embodiment, once the document 100 is positioned on the base 92 of the hand-operated document reader/imager 80, the inertia wheel 154 is spun up. The operator presses a release to engage clutch 156 with clutch engage mechanism 190 to drive the movable MICR/image subsystem 82. The energy stored in the inertia wheel 154 drives the moving MICR/image subsystem 82 over the face of the document 100 at a controlled speed.

The inertia wheel 154 and drive ratio should be sized so that the energy stored in the spinning inertia wheel 154 will be much larger than the required energy to accelerate the mass of the scan subsystem 82 and overcome the system drag and the load of the return spring (not shown), so that the speed of the scan will be nearly constant. With a properly sized inertia wheel 154, it should be possible to scan multiple documents before the wheel speed drops low enough to require re-acceleration.

When the MICR/image subsystem 82 reaches the end of its travel along guide shaft 152, after scanning a document, it will trip a release that will disengage clutch 156 with mechanism 190. The return spring (not shown) will move the MICR/image subsystem 82 back to the parked position where it will be ready for the next scan when the document is replaced.

Figure 5:
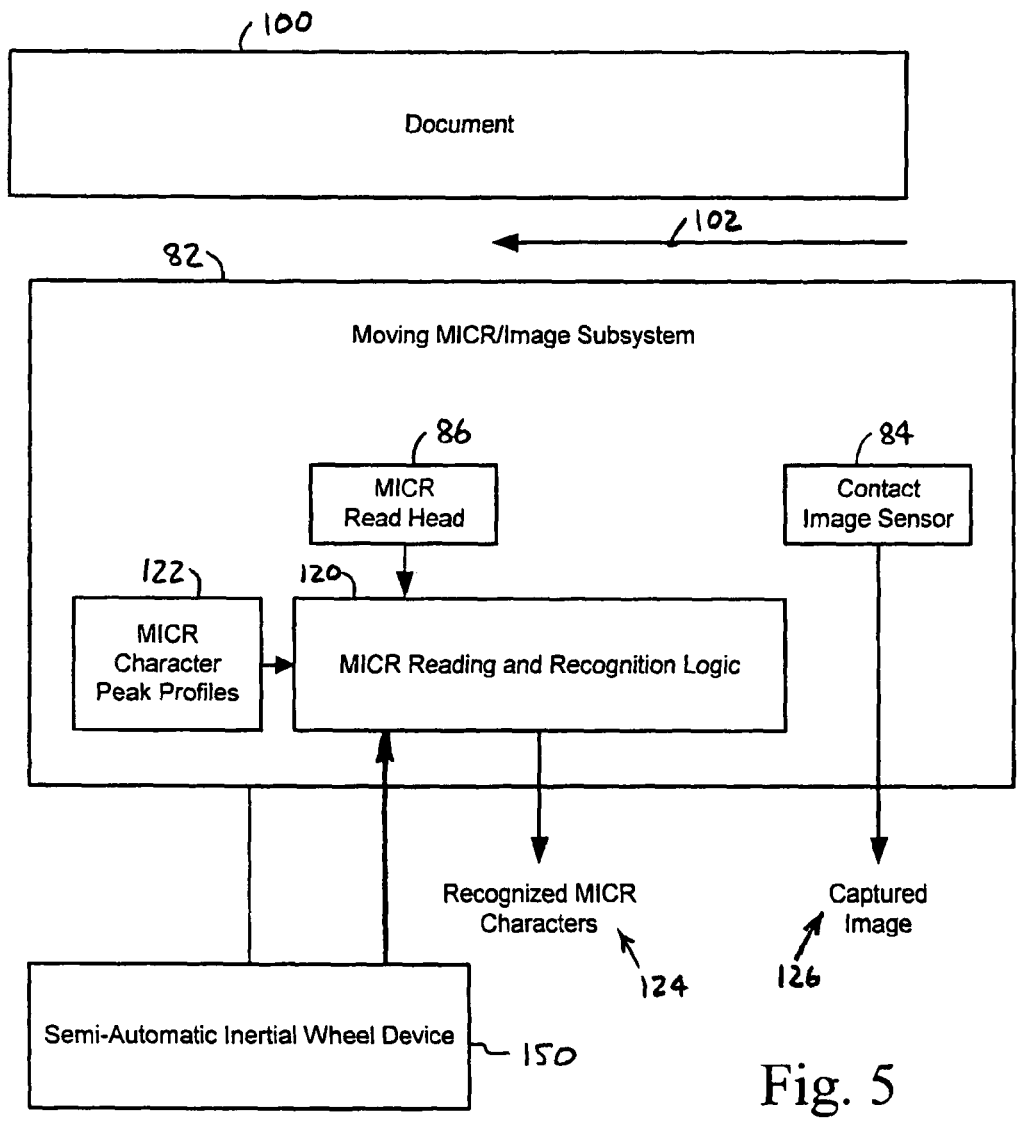
FIG. 5 is a block diagram illustrating a moving MICR/image subsystem including a semi-automatic inertial wheel device.

FIG. 5 illustrates the moving MICR/image subsystem 82 in block diagram form, including the contact image sensor 84, MICR read head 86, and semi-automatic inertial wheel device 150. As shown, the document 100 is placed on the base of the reader/imager for front image capture. Moving MICR/image subsystem 82 is moved across the document 100 as indicated by arrow 102. Block 120 represents the MICR reading and recognition logic. Logic 120 includes a traditional MICR algorithm as understood by one of ordinary skill in the art.

In the traditional MICR algorithm, the waveform obtained from the read head 86 is compared against known MICR character peak profiles 122. If the recognition is successful, the MICR reading and recognition logic 120 determines the recognized MICR characters 124. The traditional MICR algorithm is applied during the front image capture by contact image sensor 84 of a face-up document. The captured image is indicated at 126.

Logic 120 must be capable of determining the speed of the MICR and image sensors due to the variable nature of the manual operation. In accordance with the invention, semi-automatic inertial wheel device 150 provides controlled and repeatable motion of the MICR/image subsystem 82 and also provides speed feedback to the MICR reading and recognition logic 120.

Figure 6:
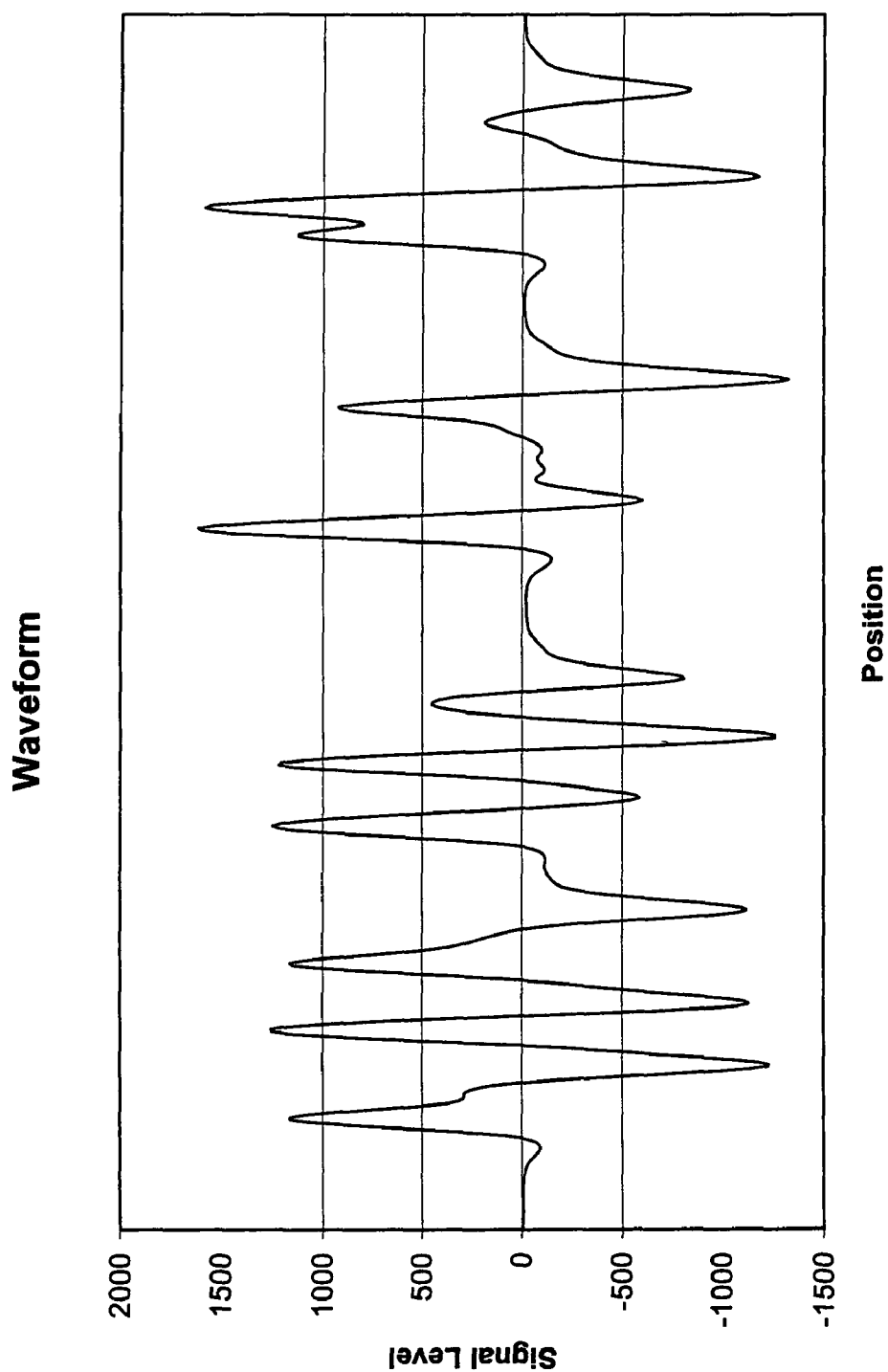
FIG. 6 illustrates a waveform for magnetic ink characters/symbols 3, 5, 7, Amount when the document containing the characters/symbols is inserted face up for front image capture in the hand-operated document reader/imager, and the magnetic ink characters/symbols are passed over from right to left.

FIG. 6 illustrates a waveform 140 for magnetic ink characters/symbols 3, 5, 7, Amount when the document containing the characters/symbols is inserted face up for front image capture in the hand-operated document reader/imager, and the magnetic ink characters/symbols are passed over from right to left. As illustrated, the x-axis represents the position of the read head, and the y-axis represents the signal level. The MICR reading and recognition logic is able to produce the waveform depicted at 140 based on the signal from the MICR read head and the signal from the tachometer. In this way, the MICR reading and recognition logic can consider the MICR read head speed during reading and recognition. Consideration of MICR read head speed is required because speed variations affect the amount of time between the peaks of each character (as well as the amplitudes of the peaks due to the variation in the rate of change of the magnetic flux resulting from the variation in the read head speed). By considering the read head speed, the time information is able to be converted into distance information, which can be compared to the MICR character peak profiles as contained in ANS X9.100-20-2006.

In one implementation, in order to obtain optimal MICR results, the MICR read head signal is sampled at a resolution of 1,000 samples per inch. When the relative speed of the document is known and constant, the desired MICR sampling rate in samples/second is determined by converting from samples per inch to samples per second based on the constant speed. For example, if the relative speed difference between the document and the MICR read head is 20 inches per second, the MICR sampling rate must be 20,000 samples per second to achieve the desired 1,000 samples per inch.

In one approach to considering the MICR read head speed during reading and recognition, the sampling rate of the MICR subsystem is varied based on the sensed speed. For example, in order to achieve 1,000 samples per inch, a speed feedback mechanism commands the MICR sampling subsystem to sample every 0.001 inches. In the embodiment of the invention illustrated in FIGS. 3-6, this speed feedback is provided by the tachometer 176. Similarly, speed feedback could be used to command the imaging subsystem to achieve a desired samples/inch resolution.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hand-operated document processor comprising:
 a base for receiving a document containing magnetic ink character data to be read and recognized;
 a manually operated moving magnetic ink character recognition (MICR) subsystem, the subsystem including a MICR read head and being attached to the base such that movement of the subsystem causes the MICR read head to pass over the magnetic ink character data on the document;
 MICR reading and recognition logic receiving the signal from the MICR read head;
 an inertial wheel arrangement including a clutch and an inertia wheel, the inertia wheel being connected through the clutch to drive the moving MICR subsystem
 a recoil starter mechanism;
 and a one-way clutch mechanism connecting the recoil starter mechanism to the inertia wheel.

2. The hand-operated document processor of claim 1 wherein the inertia wheel arrangement provides speed feedback information as the MICR read head passes over the magnetic ink character data on the document, the MICR reading and recognition logic further receiving the speed feedback information for use during character data recognition.

3. The hand-operated document processor of claim 1 wherein the moving MICR subsystem further comprises:
 an image sensor that passes over the document as the MICR read head passes over the magnetic ink character data on the document.

4. The hand-operated document processor of claim 1 further comprising:
 a speed reduction mechanism; and
 wherein the inertia wheel is connected through the clutch to the speed reduction mechanism which drives the moving MICR subsystem.

5. The hand-operated document processor of claim 1 further comprising:
 a tachometer connected to the inertia wheel and providing speed feedback information as the MICR read head passes over the magnetic ink character data on the document, the MICR reading and recognition logic further receiving the speed feedback information for use during character data recognition.

6. The hand-operated document processor of claim 5 further comprising:
a series of display elements that are illuminated based on the speed feedback to provide feedback to an operator indicative of inertia wheel speed.

7. The hand-operated document processor of claim 1 further comprising:
a linear guide shaft engaging the moving MICR subsystem for guiding the motion of the moving MICR subsystem as the MICR subsystem is driven by the inertia wheel.

8. The hand-operated document processor of claim 1 further comprising:
a belt and pulley arrangement that is driven by the inertia wheel when the clutch is engaged, the MICR subsystem being attached to the belt.

9. The hand-operated document processor of claim 1 further comprising:
a clutch engagement mechanism for engaging/disengaging the clutch to drive the moving MICR subsystem.

10. A method of operating the hand-operated document processor of claim 9, the method comprising:
spinning up the inertia wheel; and
engaging the clutch to cause the inertia wheel to drive the moving MICR subsystem.

11. A hand-operated document processor comprising:
a base for receiving a document containing magnetic ink character data to be read and recognized;
a manually operated moving magnetic ink character recognition (MICR) subsystem, the subsystem including a MICR read head and being attached to the base such that movement of the subsystem causes the MICR read head to pass over the magnetic ink character data on the document, the subsystem further including an image sensor that passes over the document as the MICR read head passes over the magnetic ink character data on the document;
MICR reading and recognition logic receiving the signal from the MICR read head;
an inertial wheel arrangement including a clutch and an inertia wheel, the inertia wheel being connected through the clutch to drive the moving MICR subsystem;
wherein the inertia wheel arrangement provides speed feedback information as the MICR read head passes over the magnetic ink character data on the document, the MICR reading and recognition logic further receiving the speed feedback information for use during character data recognition;
a recoil starter mechanism; and
a one-way clutch mechanism connecting the recoil starter mechanism to the inertia wheel.

12. The hand-operated document processor of claim 11 further comprising:
a speed reduction mechanism; and
wherein the inertia wheel is connected through the clutch to the speed reduction mechanism which drives the moving MICR subsystem.

13. The hand-operated document processor of claim 11 further comprising:
a tachometer connected to the inertia wheel and providing the speed feedback information.

14. The hand-operated document processor of claim 13 further comprising:
a series of display elements that are illuminated based on the speed feedback to provide feedback to an operator indicative of inertia wheel speed.

15. The hand-operated document processor of claim 11 further comprising:
a linear guide shaft engaging the moving MICR subsystem for guiding the motion of the moving MICR subsystem as the MICR subsystem is driven by the inertia wheel.

16. The hand-operated document processor of claim 11 further comprising:
a belt and pulley arrangement that is driven by the inertia wheel when the clutch is engaged, the MICR subsystem being attached to the belt.

17. The hand-operated document processor of claim 11 further comprising:
a clutch engagement mechanism for engaging/disengaging the clutch to drive the moving MICR subsystem.

18. A method of operating the hand-operated document processor of claim 17, the method comprising:
spinning up the inertia wheel; and
engaging the clutch to cause the inertia wheel to drive the moving MICR subsystem.

* * * * *